United States Patent
Brady et al.

(10) Patent No.: US 8,611,048 B2
(45) Date of Patent: Dec. 17, 2013

(54) APPARATUS AND METHOD FOR RECEIVING AND POSITIONING A READ/WRITE HEAD TO A DISK FOR TESTING AND METHOD OF REMOVING A TESTED READ/WRITE HEAD FROM A TEST APPARATUS

(75) Inventors: Keith Rowland Charles Brady, Fareham (GB); Graham Collins, Louvigne-du-Desert (FR)

(73) Assignee: Xyratex Technology Limited, Havant (GB)

( * ) Notice: Subject to any disclaimer, the term of this patent is extended or adjusted under 35 U.S.C. 154(b) by 193 days.

(21) Appl. No.: 13/263,042

(22) PCT Filed: Apr. 27, 2010

(86) PCT No.: PCT/EP2010/055653
§ 371 (c)(1),
(2), (4) Date: Oct. 5, 2011

(87) PCT Pub. No.: WO2010/127967
PCT Pub. Date: Nov. 11, 2010

(65) Prior Publication Data
US 2012/0038999 A1    Feb. 16, 2012

Related U.S. Application Data

(60) Provisional application No. 61/176,335, filed on May 7, 2009.

(51) Int. Cl.
*G11B 15/10* (2006.01)
*G01R 33/00* (2006.01)

(52) U.S. Cl.
USPC .................................... 360/137; 324/262

(58) Field of Classification Search
None
See application file for complete search history.

(56) References Cited

U.S. PATENT DOCUMENTS

| 6,229,303 | B1 | 5/2001 | Guzik |
| 7,520,047 | B2 | 4/2009 | Collins et al. |
| 2002/0089824 | A1 | 7/2002 | Nakano et al. |
| 2004/0036994 | A1 | 2/2004 | Kainuma et al. |
| 2005/0209797 | A1* | 9/2005 | Anderson et al. ............. 702/57 |
| 2006/0012360 | A1 | 1/2006 | Luo et al. |
| 2008/0062564 | A1* | 3/2008 | Warn ........................ 360/137 |

OTHER PUBLICATIONS

International Search Report mailed Jul. 6, 2010 in corresponding International Patent Application No. PCT/EP2010/055653.

* cited by examiner

*Primary Examiner* — Thang Tran
(74) *Attorney, Agent, or Firm* — Pillsbury Winthrop Shaw Pittman LLP (57) ABSTRACT

An apparatus for receiving and positioning a read/write head to a disk and related methods are disclosed. The apparatus includes: a deck; a spindle on the deck; a safety enclosure surrounding at least the spindle; and a movable carriage having at least one head receiving portion. The carriage is movable between a first position wherein the head receiving portion is outside the safety enclosure and a second position wherein the head receiving portion is inside the safety enclosure. The apparatus further includes an automated mechanism arranged to pick up the head from the head receiving portion when in the second position and to load the head to the disk for testing.

19 Claims, 11 Drawing Sheets

APPARATUS AND METHOD FOR RECEIVING AND POSITIONING A READ/WRITE HEAD TO A DISK FOR TESTING AND METHOD OF REMOVING A TESTED READ/WRITE HEAD FROM A TEST APPARATUS

This application is the National Phase entry of PCT/EP2010/055653, which claims the benefit of priority to U.S. provisional patent application Ser. No. 61/176,335, filed May 7, 2009, the content of these applications is incorporated herein by reference in their entirety.

The present invention relates to apparatus and a method for receiving and positioning a read/write head to a disk for testing and to a method of removing a tested read/write head from a test apparatus.

A so-called spinstand (also known as a head/media test apparatus or head tester) is a mechanical platform that can simulate the environment of a disk drive so that tests can be performed on the various components of a disk drive, such as the read/write head or the disk. Typically a spinstand comprises a high-mass deck on which is mounted a spindle for clamping and rotating a magnetic disk. Also provided on the deck is a mechanism commonly known as a test nest for holding and loading the head to the disk. Test data is then written to or read from the disk with the head.

Figure 1:
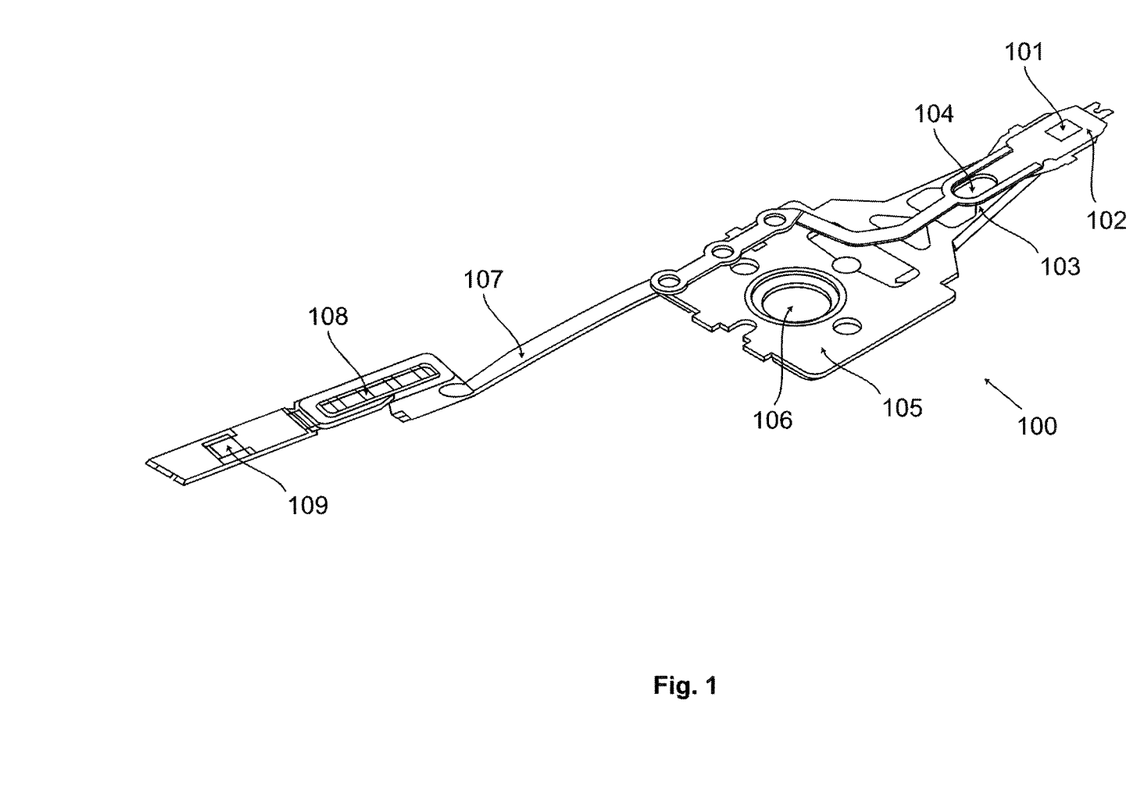
FIG. 1 shows a typical head gimbal assembly.

Testing with a spinstand can be performed in a research and development setting or in a manufacturing setting. For instance, as part of the process of manufacturing most modern disk drive assemblies, the read/write head is subjected to a dynamic electrical test on a spinstand before being incorporated into the disk drive assembly to ensure that the performance of the head is acceptable. Usually the head is tested after having been incorporated into a head gimbal assembly (HGA), such as shown by FIG. 1 and described in more detail below.

In order to test a head with a spinstand, the head to be tested must be received by the spinstand by attaching the head to the test nest. As part of the process of receiving the head in a spinstand, electrical connection must be made to the head. The head must also be must be aligned with high accuracy relative to the spinstand, a process commonly known as "precising" the head. After testing, the tested head is removed from the test nest. These steps can be performed by a human operator. Alternatively, some or all of these steps can be automated. In addition, in a manufacturing setting, heads are usually delivered for testing grouped in trays, and tested heads are usually graded according to the test results and placed in different bins as appropriate. Automation may be used for either or both of these steps also.

Automation is particularly useful in manufacturing testing, as automation can in principle perform the steps faster than a human operator and thus can lead to greater though-put of heads. Also, modern heads are particularly susceptible to electrostatic damage (ESD), to which human handling can be a significant contributory risk. Using automation to perform steps that would otherwise be carried out by a human operator helps avoid such electrostatic damage and thus improves yield loss of the heads. However, a disadvantage of using automation is that it is typically expensive.

Most known spinstands use cartridge- or block-based mechanical architectures to allow the head to be received by the spinstand. In such a scheme, a HGA is prepared for testing by being first mounted on a cartridge type device away from the spinstand, which is then in turn mounted to the spinstand. In mounting the HGA to the cartridge, the operator will align the HGA to the cartridge with great precision, i.e. precise the head, for example with the aid of a microscope, as well as making electrical connection between the HGA and the cartridge. The cartridge is then attached to the test nest of the spinstand.

The disadvantage of this technique is that the alignment process is labour intensive and time consuming, and requires a skilled operator on hand to perform correctly. Attempts to automate the loading of heads on cartridge-based spinstands have been largely unsuccessful in the past. The main reason for this is the design of the cartridges, which do not lend themselves to automation, either loading the part into the cartridge or loading the cartridge into the tester.

In other schemes, it is known to use non-cartridge-based head testing. For example, U.S. Ser. No. 11/517,570 entitled "Method and Apparatus for Loading a Read/Write Head to a Spinstand" co-owned by the present applicants and Seagate Technology LLC discloses an apparatus for loading a HGA to a spinstand. In this scheme, HGAs are provided to the apparatus arranged in trays. Automation is used to pick HGAs in turn from a tray, precise the heads and load them to the spinstand for testing. Whilst such fully automated schemes can achieve high throughput of tested heads, the automation associated with such schemes tends to be expensive, due for example to the high precision linear actuator that is used by the automation. Use of such schemes is therefore prohibitive in some cases due to the associated cost.

Another problem with loading heads to spinstands in a manufacturing setting concerns safety. Modern disk media often incorporate a glass disk substrate which can theoretically fracture at high rotational speeds, such as those that may be imparted to a disk in a spinstand. Human operators of the spinstand must be protected from the risk of flying glass from a fractured disk. A safety enclosure may be provided around the apparatus to shield the operator from the risk of flying glass. Even if the disk media is not made from glass, e.g. the disk media can be made from aluminium, a safety enclosure around the apparatus is desirable in order to protect the operator from the moving parts of the spinstand and to help protect the highly sensitive parts of the spinstand from external influences. However, where the loading of the head is not fully automated, the human operator has to open the safety enclosure to access the apparatus. In a manufacturing setting it is undesirable to stop the rotating disk each time the operator needs to access the apparatus, as this takes many seconds of cycle time and so decreases through-put of tested heads. Also, starting and stopping the spindle with the desired high accelerations requires a lot of energy, which can affect the thermal stability of the spinstand. Thermal stability is needed for precise measurements. It is easier to achieve thermal stability and thus achieve precise measurements if starting and stopping of the disk is minimised.

According to a first aspect of the present invention, there is provided apparatus for receiving and loading a read/write head to a disk for testing, the apparatus comprising: a deck; a spindle on the deck and on which a said disk can be mounted for rotation of the disk; a safety enclosure surrounding at least the spindle; a movable carriage having at least one head receiving portion for receiving a said head, the carriage being movable between a first position wherein the head receiving portion is outside the safety enclosure and a second position wherein the head receiving portion is inside the safety enclosure; and, an automated mechanism arranged to pick up the head from the head receiving portion of the carriage when in the second position and to load the head to the disk for testing.

This arrangement allows a human operator to place heads in and remove tested heads from the carriage whilst operating in safety from the risk of flying glass from a fractured disk.

The carriage then moves inside the screen to a position where automation takes the head from the carriage and loads the head to the disk for testing. A similar procedure can be used to remove tested heads from the apparatus. Thus, this arrangement allows the rotating glass disk to be completely enclosed by the safety enclosure and whilst a series of heads are received by the apparatus, tested and removed without the need to stop the spindle or have complex shielding arrangements that open and close as part of the cycle.

Alternatively, further automation can be used instead of a human operator to place or remove heads to or from the apparatus. Thus, another advantage of the present invention is that the spinstand can be upgraded to being fully automated.

The carriage can also provide a buffer between the automation and test apparatus inside the screen and the operator/other automation outside the screen, allowing both to carry out their respective tasks in an overlapping fashion. For example, while the operator is placing a head and removing a head from the carriage, a head can be being tested by the spinstand without interference.

Thus, the time taken for the operator or tray automation to exchange the tested part with a new part is not on the critical path of the test and can occur in parallel with the testing. This makes the assumption that actual head test will take longer than the exchange time. Currently a typical time for electrical test to be performed on a head is in excess of ten seconds and unlikely to significantly reduce. Ten seconds is sufficient for an operator to remove the tested part place it in a sorting bin and insert a new part.

Preferably, the carriage is mechanically isolated from the deck. In this way, the carriage is also mechanically isolated from the head under test. The operator or tray automation can place new heads to be tested to the carriage or remove tested heads from the carriage without introducing vibration to the deck which might adversely affect the precise testing being carried out, which means that the operator or automation can interact with the carriage during testing. This helps achieve a high throughput of heads in the test apparatus.

Preferably, the carriage passes through an aperture in the safety enclosure when moving between the first position and the second position. More preferably, a sleeve extends through the safety enclosure, the carriage being arranged to move through the sleeve in moving between the first and second positions. Even more preferably, the apparatus comprises at least one baffle arranged so that there is no line of sight through the sleeve. For example, a baffle can be provided at one or both ends of the sleeve, or can be attached to the carriage. These arrangements provide a simple and cost effective carriage for transferring heads between the inside and outside of the safety enclosure. The sleeve and baffle arrangement allow the carriage to move between the inside and the outside of the safety enclosure, and for the head receiving portion of the carriage to be accessed both when inside the safety enclosure and when outside the safety enclosure, and also prevent flying glass from a fractured disk from escaping the safety enclosure.

Preferably, one of more of the head receiving portions of the carriage has a coarse precising arrangement arranged to position the head with a coarse precision when a head is placed in the receiving portion. This allows the operator to simply position the head in the carriage with a coarse, general positioning, which in turn allows the automation to locate and pick up the head.

Preferably the automated mechanism is arranged to perform one or more of i) precising the head with a fine positioning and ii) making electrical connection to the head. This particular configuration automates the critical operation of precising the part and making the electrical connection to it. The repeatability of this process in testers which do this step with a human operator is a known problem. Thus the cycle time is improved.

This allows the carriage to hold a head to be tested and a tested head at the same time. Thus, after a head to be tested has been loaded to the carriage, the carriage can move inside the screen, receive the tested head in the second location, before the head to be tested is loaded to the disk. This improves the cycle time by having two heads in the cycle simultaneously.

Preferably, the automated mechanism comprises: a gripper for holding a said head during testing, the gripper being movable over a surface of the deck and operable to load the head to and/or unload the head from the disk; and, a pick arranged to pick up the head from the carriage when the carriage is in the second position and to place the head in position to be gripped by the gripper.

This provides a convenient way of loading the head to the disk from the carriage. These steps can also be used in reverse to unload a tested head from the disk and return it to the carriage.

Preferably, the pick is movable laterally with respect to the deck between a first position, where the pick can pick up a head from the carriage or set down a head on the carriage and a second position, where the pick can pick up a head from the gripper or set down a head on the gripper.

Preferably, the gripper has a fine precising mechanism that can be operated to position the head with a fine positioning whilst the head is being held by the gripper.

Preferably, the carriage has at least two head receiving portions. Preferably, the pick has two pick-up devices which are independently operable to pick up or place respective heads. Preferably, each pick-up device corresponds to a receiving portion of the carriage such that each pick-up device can pick up or set down a head in the respective receiving portion of the carriage substantially simultaneously. This arrangement allows a speedy exchange of heads with the carriage.

According to a second aspect of the present invention, there is provided a method of receiving and positioning a read/write head to a disk in a test apparatus having a safety enclosure surrounding at least the disk, the method comprising: a) moving a carriage to a first position wherein a head receiving portion of the carriage is outside the safety enclosure; b) placing a head in the head receiving portion of the carriage; c) moving the carriage to a second position wherein the head receiving portion is inside the safety enclosure; and, d) operating automation to pick-up the head from the head receiving portion of the carriage and to load the head to a disk so that testing of the head can be carried out.

Preferably, the method comprises comprising: after step c, e) operating said automation to place a previously-tested head in a second head receiving portion in the carriage; after step d, f) moving the carriage to the first position; and, g) removing the previously-tested head from carriage. This sequence allows the operator (or further automation) to remove a tested head from the carriage and/or place a new head to be tested in the carriage whilst testing is being carried out on a current head by the spinstand. This means that these operations, which are often quite lengthy, are not on the critical path and in preferred embodiments can be fully carried out in the time taken for the head to be tested. Preferably the carriage is mechanically isolated from the head and disk holding parts of the apparatus (both normally mounted to a deck in a spinstand) so that vibration is not introduced whilst testing is being carried out.

Preferably, the automation comprises a pick having first and second pick-up devices which are independently operable to pick up or place respective heads, wherein steps d and e comprise picking up the head from the first head receiving portion of the carriage with the first pick-up device and setting down the previously-tested head in the second receiving portion of the carriage with the second pick-up device. This allows a new head and a previously tested head to be exchanged with the carriage in a simple and efficient way. In particular, both heads can be exchanged without additional lateral movement of the pick or carriage in between. Indeed, both heads can be exchanged with the carriage substantially simultaneously, leading to further efficiency and increase in throughput of tested heads.

Preferably, the automation comprises a gripper for holding the head during testing, the gripper being operable to load or unload the head to or from the disk, the method comprising: moving one or both of the gripper and the pick such that the previously-tested head is in position to be picked up from the gripper by the second pick-up device; and, moving one or both of the gripper and the pick such that the head held by the first pick-up device is in position to be gripped by the gripper. This provides an advantageous way of moving heads between the gripper and the pick. Where the gripper moves, this takes advantage of the fact that the gripper is commonly mounted to a movable puck that is movable to move the head to different positions on the disk, and so this arrangement can in effect "re-use" the actuators that move the puck, keeping the number of additional actuators to a minimum.

Preferably, the method comprises repeating the steps as described above to test a succession of heads.

According to a third aspect of the present invention, there is provided a method of removing a tested read/write head from a test apparatus, the test apparatus having a disk and a safety enclosure surrounding at least the disk, the method comprising: a) moving a carriage to a position inside the safety enclosure; b) operating automation to unload the tested head from the disk and to place the head in a head receiving portion of the carriage; c) moving the carriage to a position outside the safety enclosure; and, d) removing the head from the carriage.

Embodiments of the present invention will now be described by way of example with reference to the accompanying drawings, in which.

Read/write heads for use in a hard disk drive assembly are usually tested once the slider has been mounted on the suspension, i.e. once they have been incorporated into a head gimbal assembly (HGA). FIG. 1 shows a typical HGA 100 of the type testable by a spinstand. The HGA 100 has a magnetic read/write head 101 for reading from and writing to a disk. The head 101 is supported on a slider which in turn is mounted via a gimbal 102 to a suspension arm 103. These are arranged to "fly" the head 101 over the surface of the disk at an appropriate height for reading from and writing to the disk. The suspension arm 103 also has a tooling slot 104 formed in it. The suspension arm 103 is attached to a base plate 105. The base plate 105 has a boss hole 106 in its centre by which the HGA 100 can be held. A flex circuit 107 connects to the head 101 at one end and terminates in electrical contacts 108 at its other end, allowing connections to be formed to the HGA 100 by the spinstand electronics.

Figure 2:
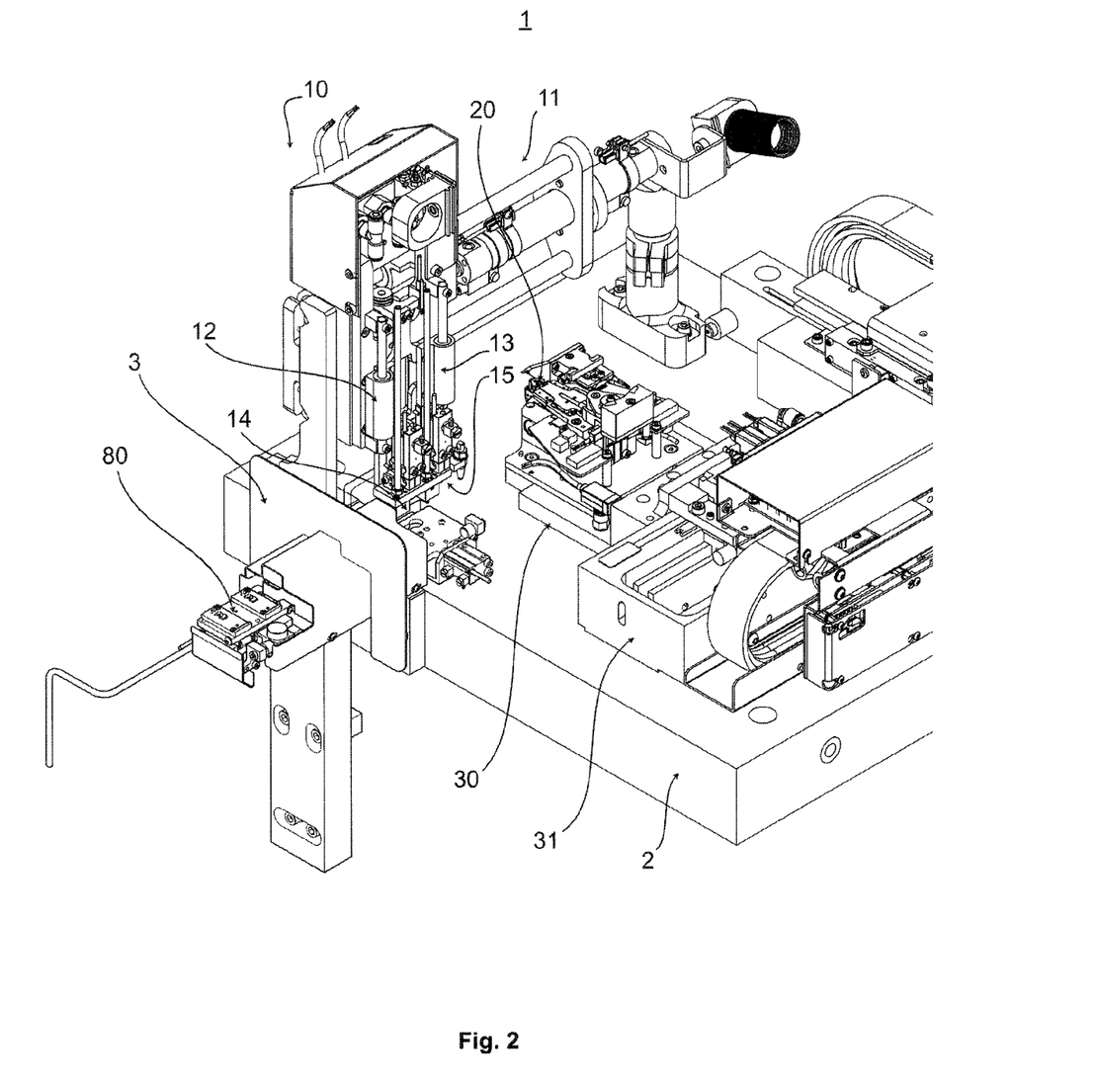
FIGS. 2 and 3 show an example of a test apparatus according to an embodiment of the present invention.
Figure 3:
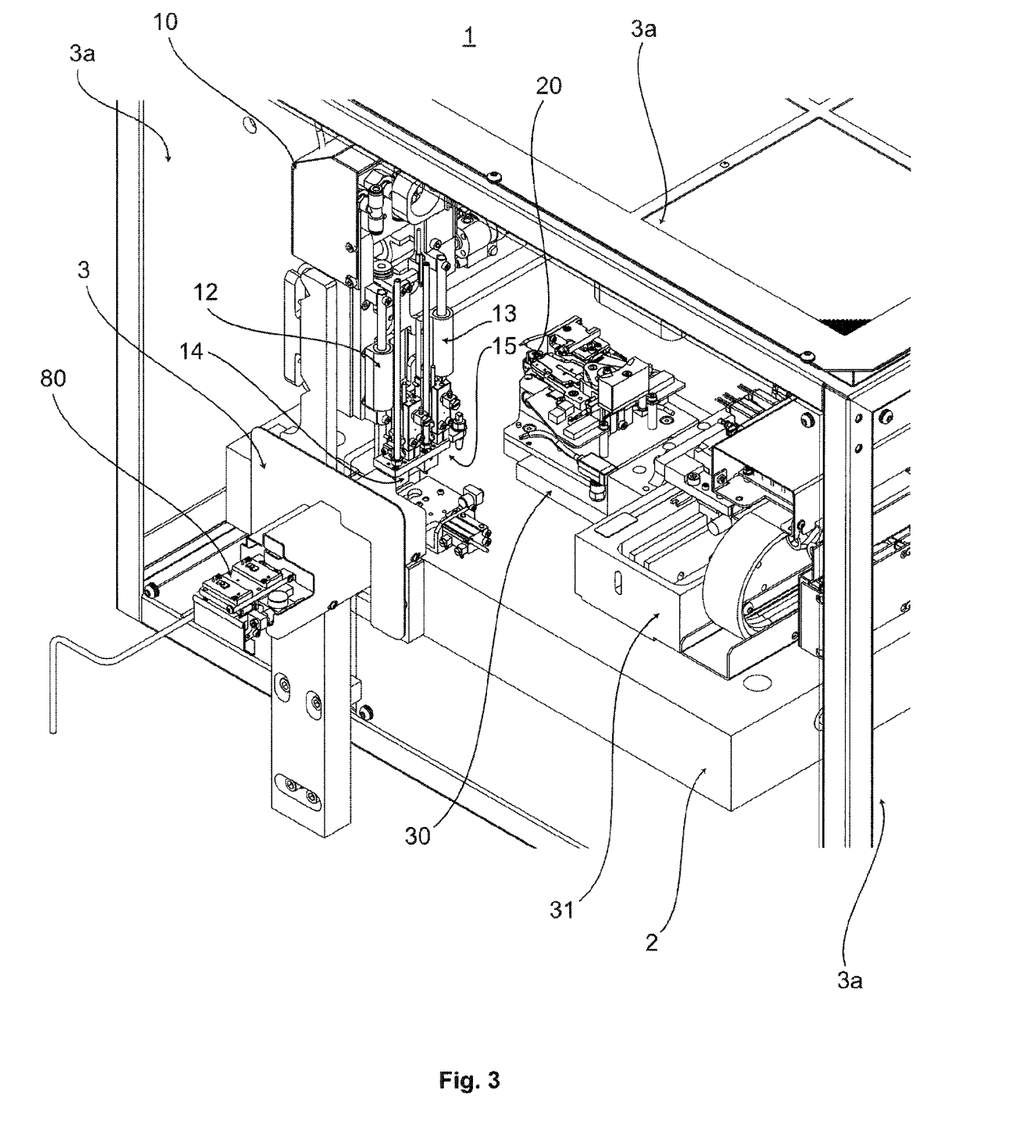

Referring to FIGS. 2 and 3, an apparatus for testing a read/write head (also known as spinstand) 1 comprises a deck 2. The deck 2 has a high mass, for example being made from a block of granite. The deck 2 is arranged to float on pneumatic or other vibration damping mounts. This isolates the spinstand 1 from external vibrations and provides a very stable mechanical platform on which testing may be performed. As will be appreciated, it is important to isolate the spinstand from external vibrations as much as possible, as these can adversely affect the delicate testing being performed by the spinstand.

A safety enclosure 3 surrounds the deck 2 (shown only partially in FIG. 2 for clarity, but shown in FIG. 3). The safety enclosure 3 may for example comprise walls 3a made from plexi-glass or some other suitable material. The safety enclosure 3 is preferably mechanically isolated from the deck 2. The safety enclosure 3 is arranged to protect the operator of the spinstand 1 from injury when in use. In particular, some disk media 5 incorporate a glass disk substrate which can fracture at high rotational speeds, such as those that may be imparted to the disk 5 in the spinstand 1. The safety enclosure 3 is provided around the apparatus to shield the operator from the risk of flying glass in the event of fracture of the disk 5.

The spinstand 1 has a spindle assembly 4 (shown only in FIGS. 6 to 11 and not shown in FIGS. 2 and 3 for clarity) for holding a disk 5 to be tested. This will typically be an air bearing spindle with an integrated DC brushless motor. In the present example, the spindle assembly 4 is attached to the underside of the deck 2 so that the spindle shaft extends through a hole in the deck 2 and the end of the spindle to which the disk 5 is clamped is uppermost. Alternatively, the spindle may have an inverted configuration, in which it is attached to a bridge structure mounted to the deck 2, so that the spindle extends downwards from the bridge towards the deck 2 and the end of the spindle to which the disk 5 is clamped is lowermost.

The spinstand 1 also comprises a pick device 10 attached to a linear actuator 11 that is operable to move the pick device 10 laterally relative to the surface of the deck 2 (i.e. in the x-y plane). In the present example, the pick device 10 is mounted (via the linear actuator 11) to the deck 2. However, the pick device 10 could alternatively be mounted elsewhere, for example to the safety enclosure 3. The pick device 10 comprises first and second kickers (or pick-up devices) 12,13 having respective first and second end effectors 14,15 disposed on their ends. Each kicker 12,13 is capable via air actuation or a servo controlled motor or other appropriate actuator of moving its respective end effector 14,15 in the z-direction, allowing the end effectors 14,15 to be independently vertically raised or lowered. The end effectors 14,15 have a generally flat and square lowermost surface having four vacuum ports generally adjacent each corner of the lowermost surface so as to be aligned with positions on the base plate 105 of a HGA 100.

Thus, with a HGA 100 positioned beneath either kicker 12,13, the kicker 12,13 can be actuated to lower the end effector 14,15 to be in contact with or positioned closely above the base plate of the HGA 100. A vacuum can then be applied to the ports of the end effector 14,15 so that ambient air pressure causes the base plate to be forced against the lower surface of the end effector 14,15. In other words, the HGA 100 is "vacuumed" or "suctioned" onto the end effector 14,15 to hold it in place. The kicker 12,13 can then be actuated upwards, thereby picking up the HGA 100. The HGA 100 can be put down by the kicker 12,13 by a similar process in reverse.

Figure 4:
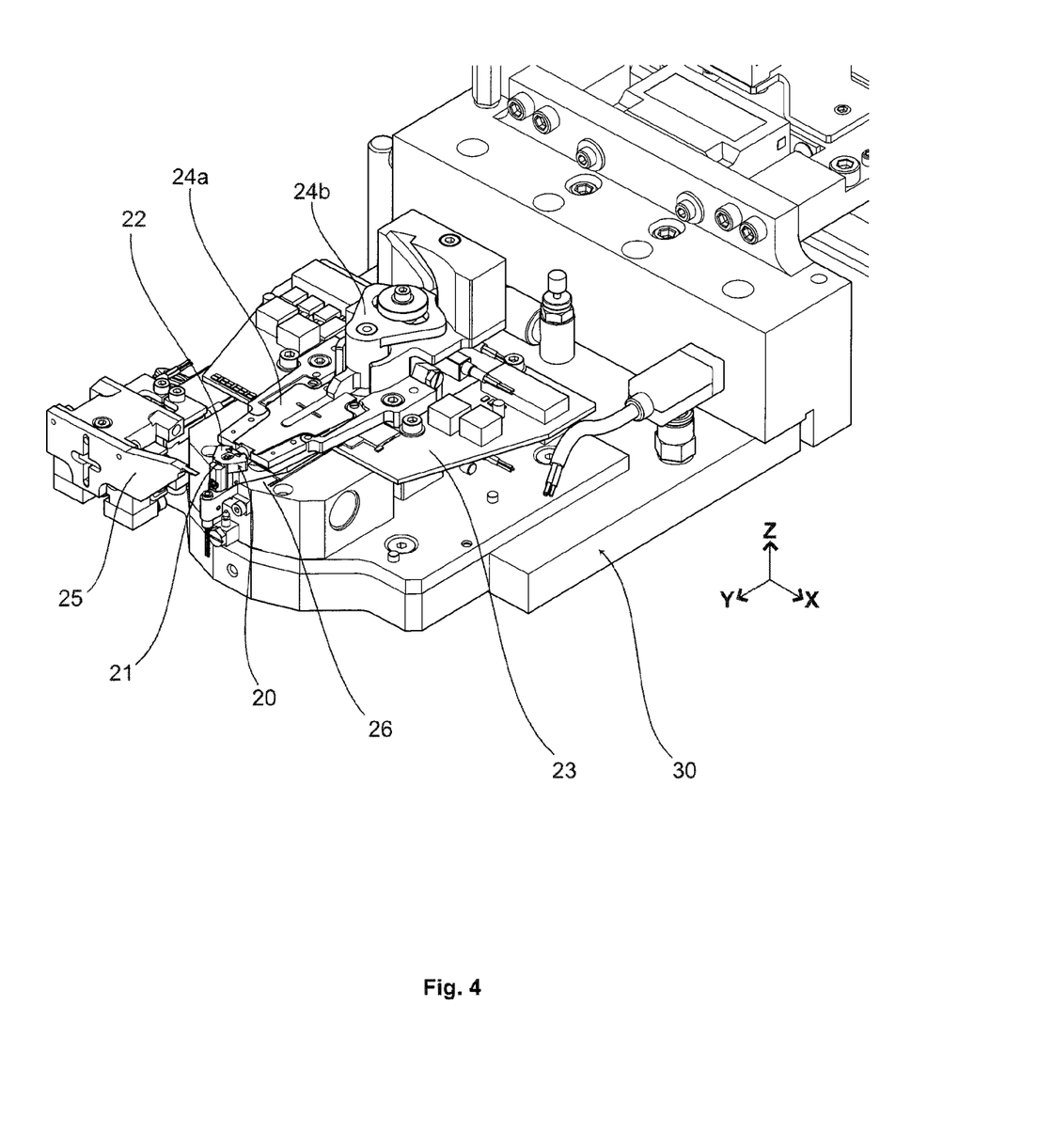
FIG. 4 shows a detail view of the test nest and puck of FIG. 2.

As shown in more detail in FIG. 4, the spinstand 1 has a so-called "test nest" 20 (or gripper) which is adapted to hold a HGA 100 during testing. Various ways of implementing a test nest 20 are known in the prior art, so this will not be described in detail here. Nonetheless, in general, the test nest 20 will have a mechanism 21 that can be actuated to engage the base plate 105 around the boss hole 106 and to clamp the base plate 105 against the test nest 20. The mechanism 21 can also be actuated to release the base plate 105.

The test nest 20 is mounted on a movable stage so as to be movable over the surface of the deck 2. In the embodiment shown in the drawings, the movable stage comprises a so-called puck 30 which is mounted on the deck 2 by an air bearing (not shown). The puck 30 is movable in two orthogonal directions on the surface of the deck 2 by a highly accurate x-y positional stage 31, also supported by air bearings (not shown). The x-y positional stage 31 has linear encoders (not shown) to allow the position of the puck 30 to be highly accurately determined. The puck 30 is thus capable of moving the HGA 100 to a desired location on the deck 2 with great precision. In particular, the puck 30 is used during testing to move the head 101 to a desired location relative to the surface of the disk 5, for example to a particular track on the disk 5. The puck 30 and the elements of the x-y stage 31 can be locked down to the surface of the deck 2 by application of a vacuum. This helps prevent movement of the puck 30 when in a desired position. Other arrangements of the puck 30 and the positional stage 31 are possible.

The test nest 20 also has a precising mechanism 22. When the HGA 100 is held by the mechanism 21, the precising mechanism 22 may be actuated to accurately orientate the HGA 100 relative to the test nest 20. Since the test nest 20 and the spindle 4 are both accurately referenced relative to the deck 2, the positioning of the head of the HGA 100 relative to the disk 5 is precisely set by this process. The test nest 20 also has a preamp board 23 for pre-amplifying the data signals from the head 101, and a contact clamping mechanism 24a, 24b to make electrical connection from the preamp board 23 to the contacts 108 of the HGA 100.

The puck 30 also has a head load/unload mechanism 25 (for example, a ramp loader) for loading and unloading the head 101 to and from the test surface of the disk 5. A nanopositioner 26 is disposed between the puck 30 and the test nest 20, which allows very fine positional changes of the head 101 to be made relative to a test track on the disk 5.

Thus, as part of the process of loading a head 101 to the disk 5 for testing, the HGA 100 is first attached to the test nest 20 via the mechanism 21. The HGA 100 is then precised and electrical connection made to it as described above. The puck 30 moves the HGA 100 to a general position relative to the disk 5. The head load mechanism 25 loads the head 101 to the spinning disk 5. Data can then be written to or read from the a test track of data on the disk 5, whilst the nanopositioner 26 is used to make fine positional changes to the head 101 relative to the test track.

Figure 5:
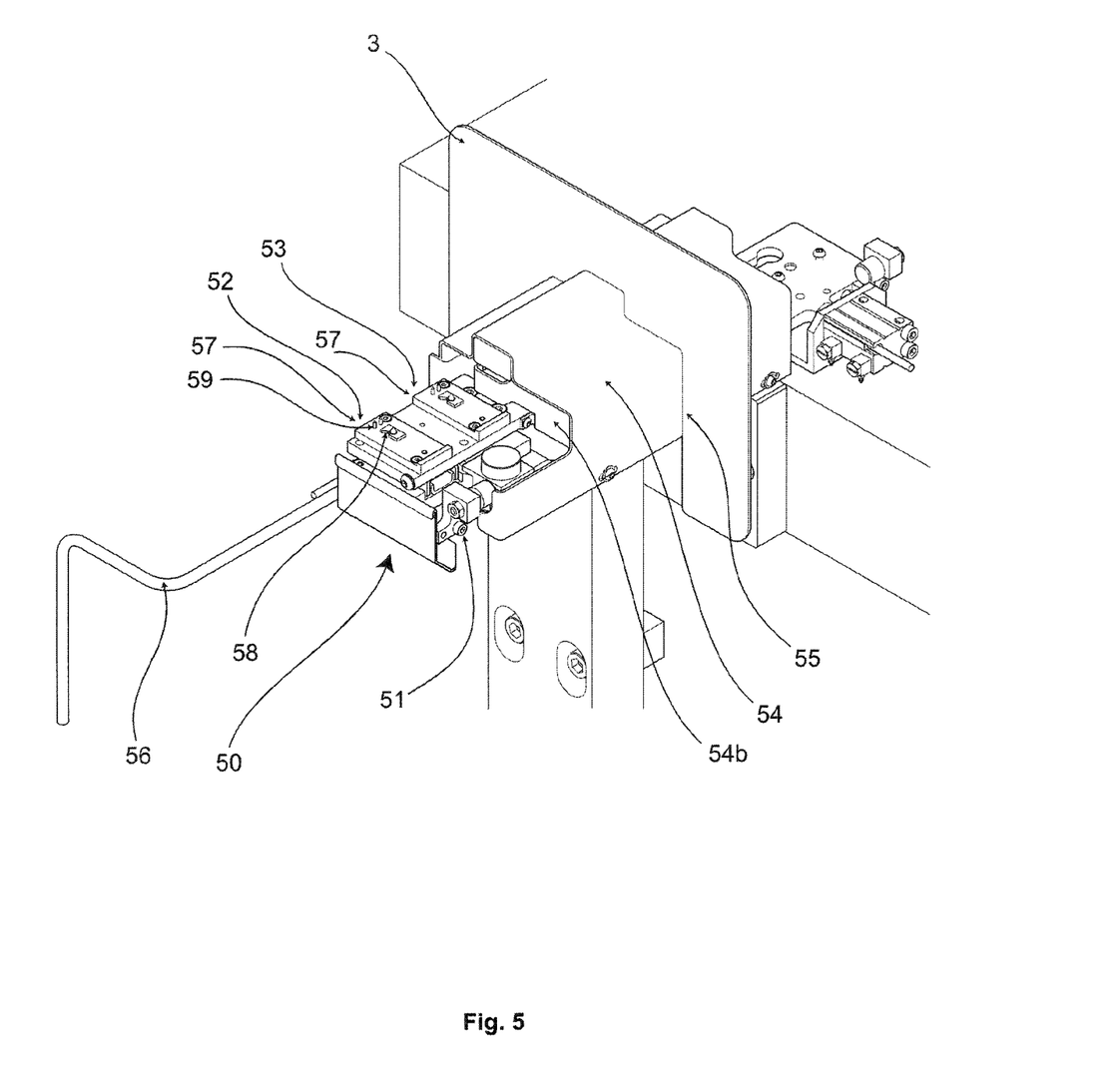
FIG. 5 shows a detail view of the carriage of FIG. 2.

The spinstand 1 also has a carriage or shuttle 50 (as shown in more detail in FIG. 5). The carriage 50 has two HGA receiving portions 52,53 thereon, each for receiving and holding a HGA 100. A sleeve 54 extends through an aperture 55 in the safety enclosure 3, through which the carriage 50 moves in a manner similar to a matchbox. One or more baffles 54b are provided so that there is no line of sight through the sleeve 54 in any position of the carriage 50. In this example, a single baffle 54b is mounted to the carriage 50 near to the end of the carriage 50 that is closest to the deck 2. The arrangement of the carriage 50, the sleeve 54 and the baffle 54b is such that there is no line of sight through the safety enclosure at any position of the carriage 50. As will be described in more detail in the following description in relation to FIGS. 6 to 11, the carriage 50 moves between a first position (as shown in FIG. 2) where the HGA receiving portions 52,53 are outside the safety enclosure 3 and a second position where the HGA receiving portions 52,53 are inside the safety enclosure 3.

The carriage 50 may be mounted on a rail and supported by bearings or the like to provide smooth movement of the carriage 50, and manually moved by an operator by a handle 56. Alternatively, the carriage 50 may be mounted on an actuated linear stage (not shown) that can be made to shuttle between the two positions, for example by computer control or by an operator pressing a button. If the carriage 50 is actuated, a safety hazard may exist for the operator becoming trapped in this mechanism. Therefore the linear stage may be arranged to have lower power and speed near where the carriage 50 is in the first position where an operator could be affected. This can be achieved for example by constructing the linear stage from two stacked stages: one slow and one fast. The carriage 50 is mechanically isolated from the deck 2 to avoid introducing vibration to the spinstand through movement of the carriage 50.

At least the first receiving portion 52 of the carriage 50 has a coarse precisor 57 arranged to receive a HGA 100 and give it a general positioning. The coarse precisor 57 includes a boss pin 58 and a pair of "goalposts" 59 in the form of pins projecting upwards from the uppermost surface of the carriage 50. When a HGA 100 is placed on the coarse precisor 57, the boss pin 58 engages with the boss hole 106 in the base plate 105 of the HGA 100, thereby coarsely positioning the HGA 100 in the x-y direction. The goalposts 59 accept the suspension arm 103 between and give a rough theta positioning to the HGA 100. In the present example, both receiving portions 52,53 have a course precisor 57 as described.

The first position of the carriage 50 positions the first and second receiving portions 52,53 so as to be accessible to an operator outside the safety enclosure 3. The second position of the carriage 50 positions the two receiving portions 52,53 to lie underneath the two end effectors 14,15 of the pick device 10 when the pick device 10 is in the first position so that each of the first and second kickers 12,13 can pick up a HGA 100 from or put down a HGA 100 in the first and second receiving portions 52,53 of the carriage 50 respectively. As well as being movable to position the head 101 under the disk 5 as described above, the puck 30 can be moved such that the test nest 20 lies underneath each of the end effectors 14,15 of the pick device 10 when the pick device 10 is in the second position. Thus, as described in more detail below, by appropriate positioning of the carriage 50 and puck 30 and by appropriate operation and positioning of the pick device 10, HGAs 100 can be transferred between the carriage 50 and the test nest 20 via the pick device 10.

For example, to transfer a HGA 100 from the first receiving portion 52 of the carriage 50 to the test nest 20 the following sequence is performed.

1. The carriage 50 is moved to the second position and the pick device 10 is moved to the first position so that the base plate 105 of the target HGA 100 (being initially positioned on the first receiving portion 52) is under the first end effector 14.
2. The first kicker 12 is actuated downwards so that the first end effector 14 is in contact with the base plate 105 of the HGA 100.

3. A vacuum is applied to the ports of the end effector 14, thereby causing it to hold the HGA 100.
4. The first kicker 12 is actuated upwards, thereby picking up the HGA 100.
5. The carriage 50 is moved back to the first position, the pick device 10 is moved to the second position and the puck 30 is moved so that the test nest 20 is under the first end effector 14.
6. The first kicker 12 moves down, and the test nest 20 grips the HGA 100.
7. The vacuum is removed from the ports of the end effector 12.
8. The kicker 11 is actuated upwards, leaving the HGA 100 held by the test nest 20.

To unload a HGA 100 from the test nest 20, a similar operation is performed in reverse using the second kicker 13 and the second receiving portion 53 of the carriage 50.

Figure 6:
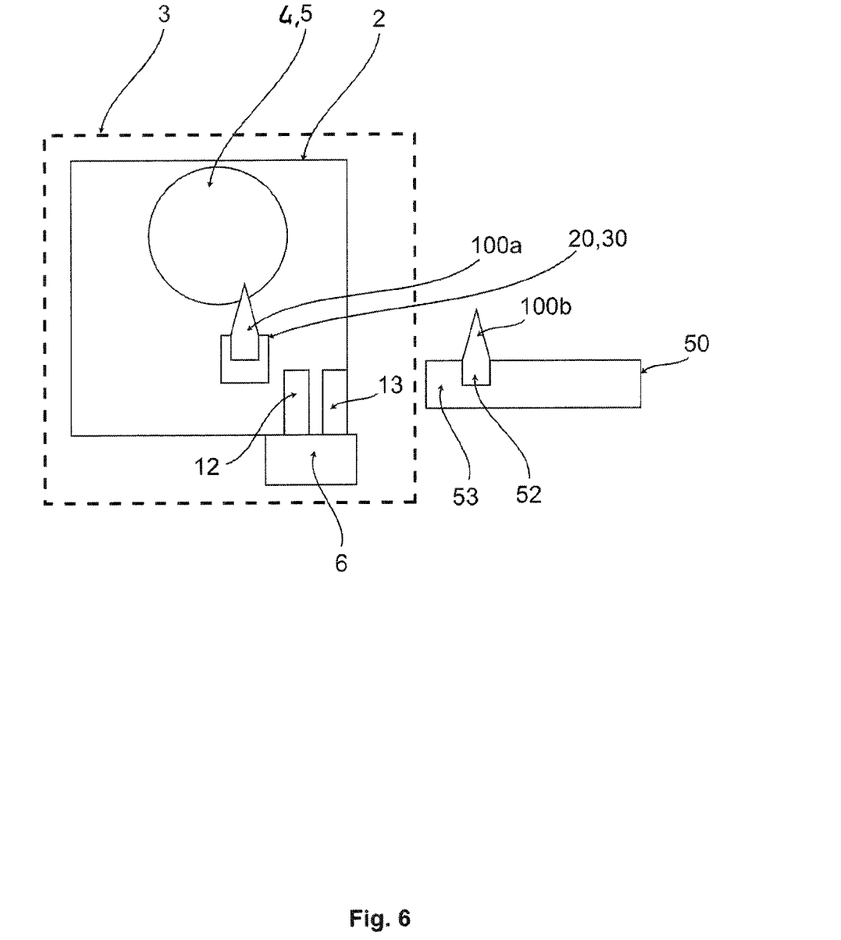
FIGS. 6 to 11 show schematically the test apparatus of FIG. 2 at a various points during a testing cycle.
Figure 7:
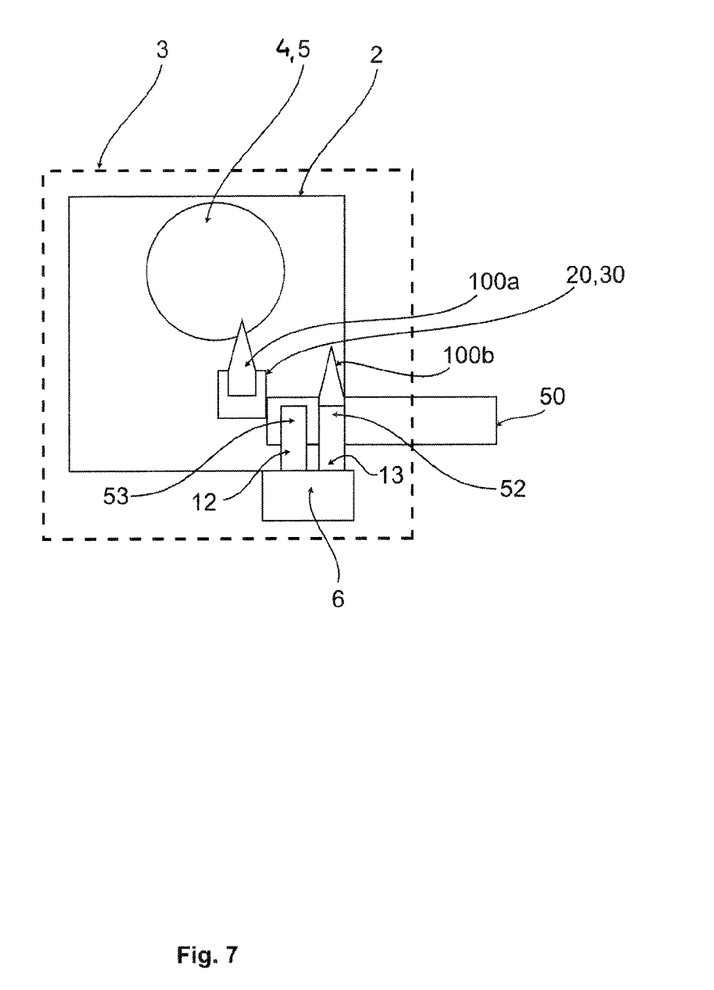
Figure 8:
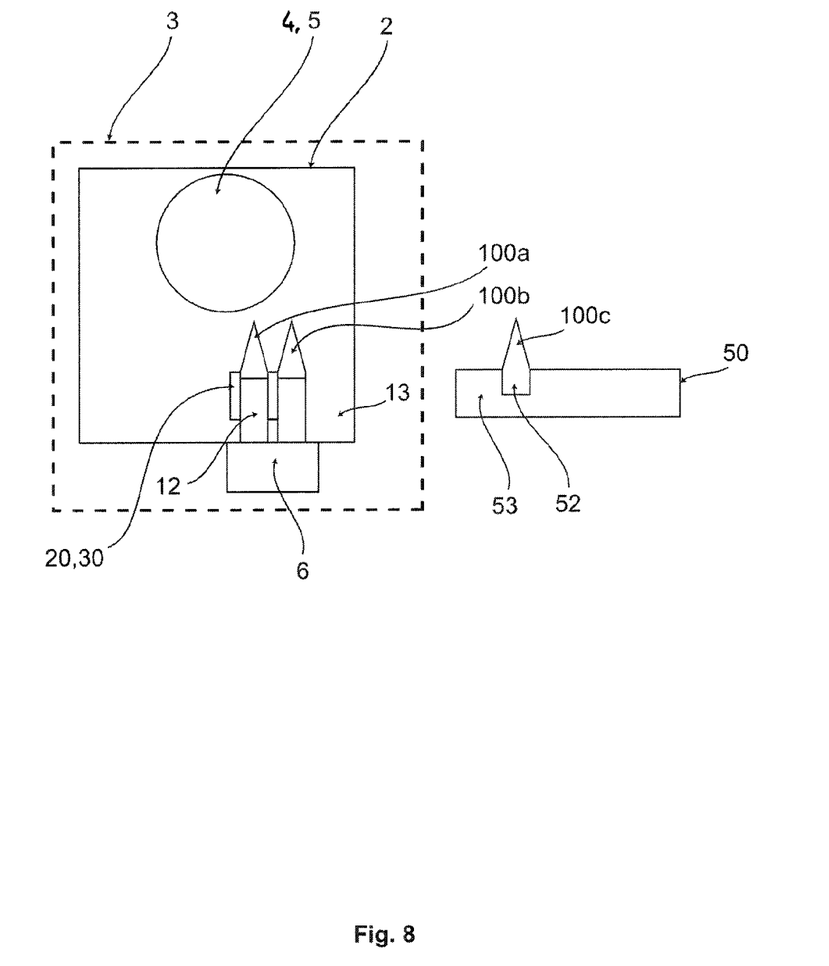
Figure 9:
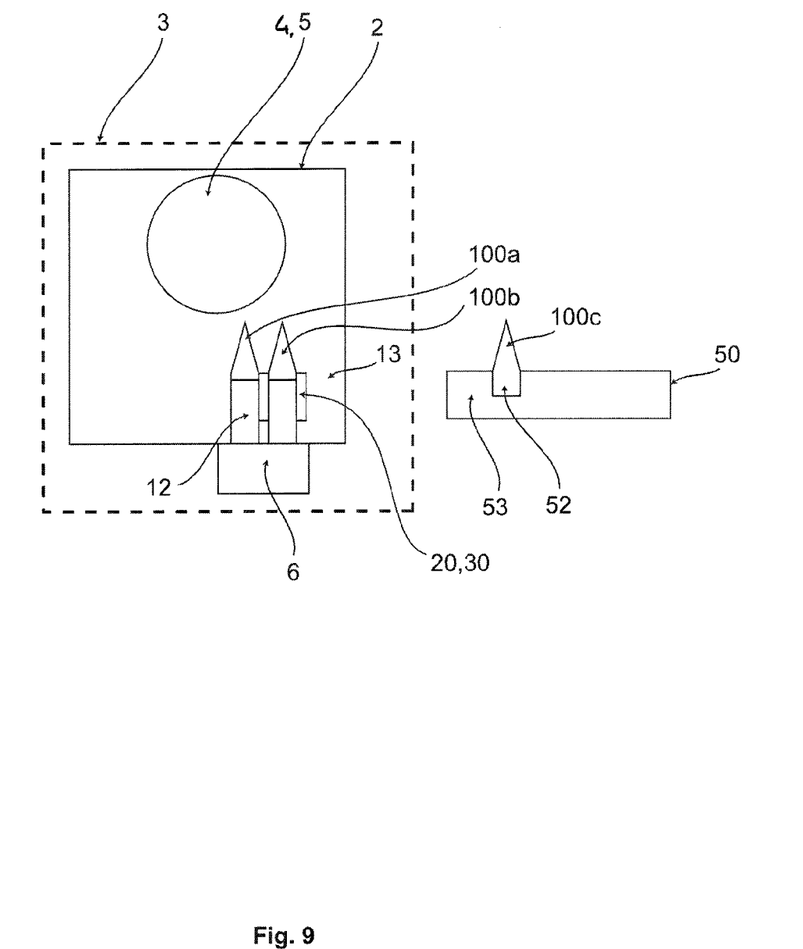
Figure 10:
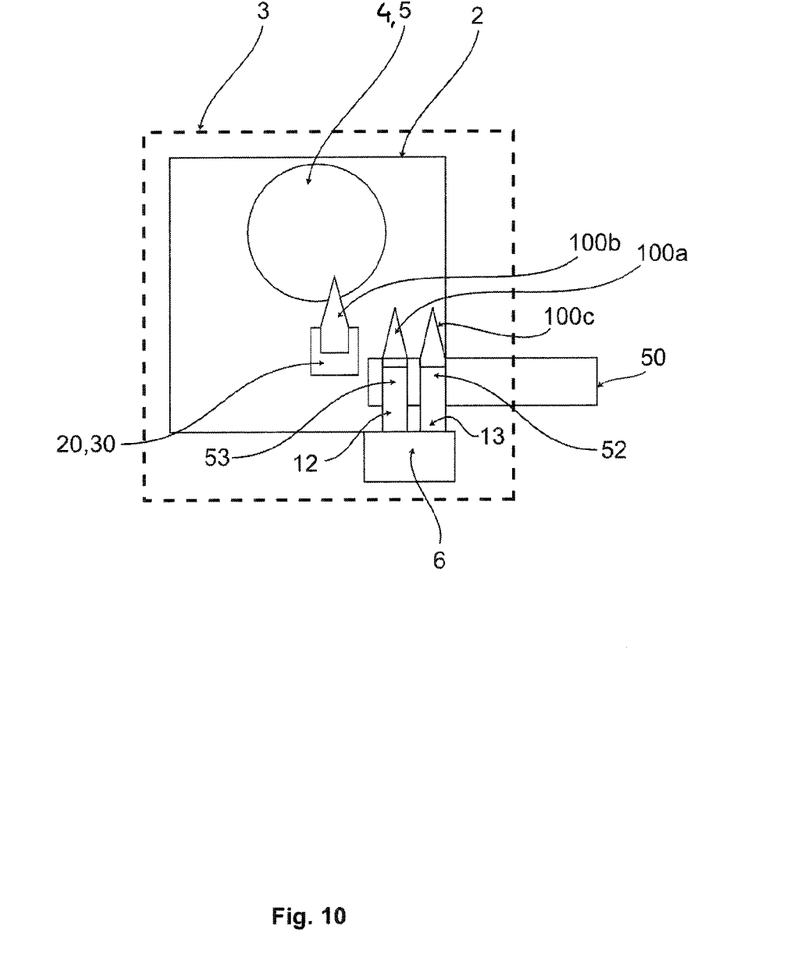

In order to test the HGA 100, the following steps are performed.
1. FIG. 6 shows the test apparatus in a first point during testing. A HGA 100a is held by the test nest 20 and loaded to the disk 5 and testing is being carried out. During testing, the pick device 10 is in the first position and the carriage 50 is withdrawn to the first position. During testing, a new HGA 100b to be tested is placed manually in the coarse precisor 57 of the first receiving portion 52 by the operator.
2. The carriage 50 is moved to the second position. When dynamic testing of the HGA 100a is finished, the first kicker 12 picks up the new HGA 100b from the carriage 50. This is shown in FIG. 7.
3. The empty carriage 50 is withdrawn to the first position. A further new HGA 100c that is to be tested is placed manually in the coarse precisor 57 of the first receiving portion 52 by the operator. The tested HGA 100a is unloaded from the disk 5. The pick device 10 moves to the second position and the puck 30 moves so that the test nest 20 holding the tested HGA 100a is underneath the second kicker 13 which picks up the tested HGA 100a. This is shown in FIG. 8.
4. The puck 30 moves so that the test nest 20 is under the first kicker 12 which drops the new HGA 100b to the test nest 20. The new HGA 100b is precised and electrical connection made whilst being held by the test nest 20. This is shown in FIG. 9.
5. The puck 30 moves to the test position and the pick device 10 moves to the first position. The carriage 50 moves to the second position, so that the first receiving portion 52 lies underneath the first kicker 12 and the second receiving portion 53 lies underneath the second kicker 13. The pick device 10 is actuated so that the first kicker 12 picks up the further new HGA 100c from the first receiving portion 52 and the second kicker 14 places the tested HGA 100a in the second receiving portion 53. Testing commences on the new HGA 100b. This is shown in FIG. 10.

Note, in the present example, the exchange of HGAs 100 with the carriage 50 in step 5 occurs before testing commences. Alternatively, the exchange could be performed after testing. In any case, during testing the pick should be raised and inactive to avoid introducing vibration.
6. As testing continues, the carriage 50 is moved to the first position so that the tested HGA 100a can be removed from the apparatus 1. This is shown by FIG. 11.

Figure 11:
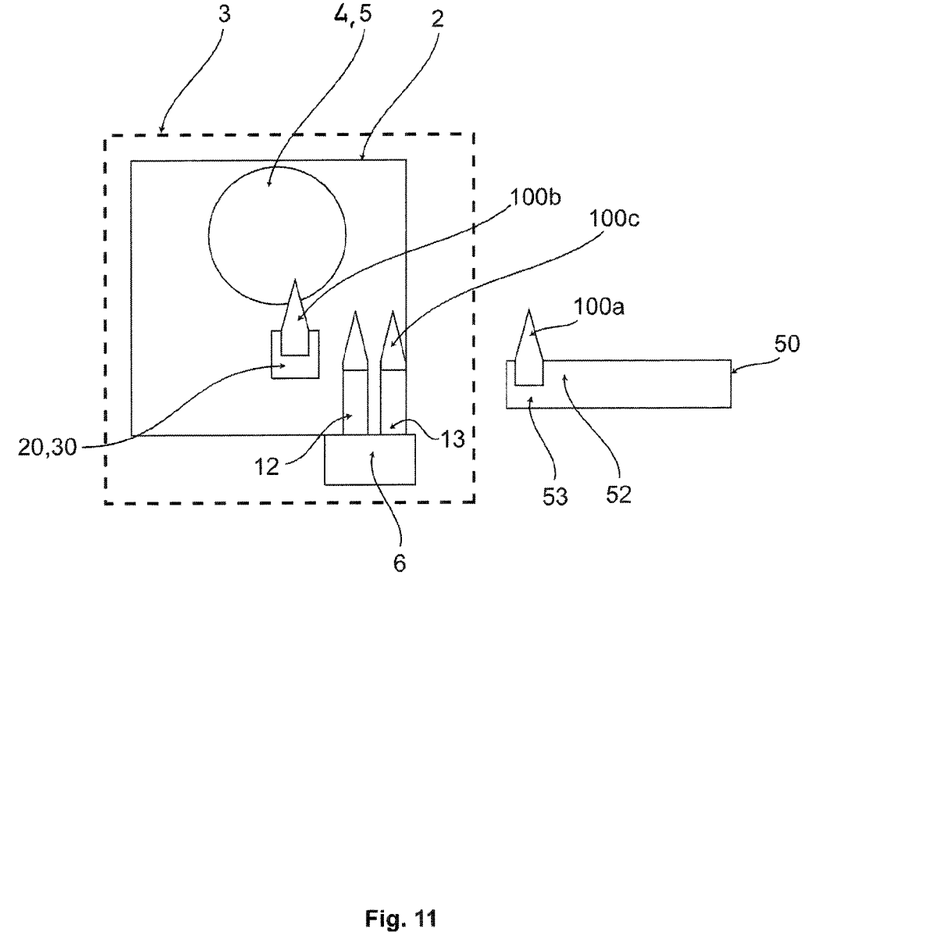

FIG. 11 show the apparatus in the same state as FIG. 7, wherein a HGA 100a has undergone the complete testing cycle. I.e. FIGS. 7 to 11 show a complete cycle to test a HGA. As part of the cycle, a new HGA 100 is placed in the carriage 50 by the operator whilst another HGA 100 is being tested. Thus, the time taken for the operator or automation to exchange the tested HGA with a new HGA is not on the critical path of the test and can occur in parallel. This makes the assumption that actual head test will take longer than the exchange time. Currently the electrical test time is in excess of 10 seconds and is unlikely to significantly reduce. 10 seconds is sufficient for an operator to remove the tested HGA place it in a sorting bin and insert a new HGA. The apparatus 1 automates the critical operation of precising the HGA 100 and making the electrical connection to it, the repeatability of this process in test apparatus where this step is carried out by a human operator is a known problem. Of course, if desired, HGAs 100 can be handled one at a time, with a new HGA 100 being loaded to the carriage only when the existing HGA 100 is removed.

The carriage 50 is isolated from the deck 2, so that a new HGA 100 can be put in the carriage 50 or a tested HGA 100 removed from the carriage 50 without introducing vibration that would adversely affect the accuracy of head testing under way. However if any part of the apparatus 1, either the pick device 10 or the carriage 50 is not attached to the deck 2 there may need to be additional mechanisms to guide the kickers 12,13 on to the target location, as the deck 2 is floating and not accurately referenced.

This scheme also provides a means of ensuring that the rotating disk 5 is completely enclosed and HGAs 100 can be exchanged without the need to stop the spindle 4 or have complex shielding arrangements that open and close as part of the cycle.

Thus, the apparatus described above provides a semi-automated test apparatus, wherein the automation provides making electrical connection to the HGA 100 and precising the HGA 100. The human operator carries out taking the part from the tray and placing it in the test apparatus, and removing the tested part from the test apparatus, placing it in one of a number of trays or bins based upon the result of the test (grading). These steps are the most costly to automate. Thus, the apparatus 1 gives the advantages of using automation to perform some tasks and the human operator to perform tasks well suited to the human operator, wherein the human steps are not on the critical path and so a low cycle time is maintained. This leads to a cost effective test apparatus wherein the human operator can operate safely without compromising the test time.

Nonetheless, the spinstand 1 is capable of being upgraded to being fully automated. For example, instead of a human operator placing and removing HGAs 100 to and from the carriage 50, the carriage 50 can be replaced by additional automation arranged to load the HGAs 100 to the spinstand (see for example, U.S. Ser. No. 11/517,570 entitled "Method and Apparatus for Loading a Read/Write Head to a Spinstand" co-owned by the present applicants and Seagate Technology LLC discloses). This offers benefits to manufacturers, who can upgrade the test apparatus 1 to full automation through-out its lifetime. For example, they may initially opt to have a reduced automation feature set taking care of the electrical connection and precising only, and later upgrade to full automation to handle the trays and moving HGAs between the trays and the test nest 20.

Other ways of loading the HGA 100 to the disk 5 and precising the HGAs 100 are contemplated. For example, instead of the precising being carried out by a mechanism on the test nest 20, a fine precisor (not shown) may be provided on the puck 30 arranged to give a precise positioning to the HGA 100 when the HGA 100 is placed upon it. When the pick device 10 moves a HGA 100 to the test nest 20, before placing the HGA 100 on the test nest 20, the puck 30 is first moved so that the fine precisor is under the pick device 10. The HGA is then pushed onto the fine precisor by the pick device 10 to give it a fine positioning. The pick device 10 then lifts the HGA 100 off the fine precisor and the puck 30 is moved so that the test nest 20 is under the pick device 10. The precised HGA 100 is then transferred to the test next 20.

In addition, other arrangements of the pick device 10 are contemplated. For example, the pick device 10 need not be movable in the x-y direction, but rather could be fixed in the x-y direction. In this arrangement, only the carriage 50 and the puck 30 would move (i.e. not the pick device 10) to be in position relative to the pick device 10 to allow the HGAs 100 to be exchanged by the pick device 10. Additionally, the pick device 10 may have a single kicker rather than two kickers 12,13. In this scheme, the carriage 50 would need to be moved to two positions within the enclosure 3 so that the first and second portions 52,53 are in turn under the kicker to allow the exchange of HGAs 100 to be made.

Embodiments of the present invention have been described with particular reference to the example illustrated. However, it will be appreciated that variations and modifications may be made to the examples described within the scope of the present invention. For example, the invention is not limited to the specific spindle types or arrangements, or puck 30 positioning devices, or actuators specifically described in the description.

The invention claimed is:

1. Apparatus for receiving and loading a read/write head to a disk for testing, the apparatus comprising:
    a deck;
    a spindle on the deck and on which said disk can be mounted for rotation of the disk;
    a safety enclosure surrounding at least the spindle;
    a movable carriage having at least one head receiving portion for receiving said head, the carriage being movable between a first position wherein the head receiving portion is outside the safety enclosure and a second position wherein the head receiving portion is inside the safety enclosure; and,
    an automated mechanism arranged to pick up the head from the head receiving portion of the carriage when in the second position and to load the head to the disk for testing.

2. Apparatus according to claim 1, wherein the carriage is mechanically isolated from the deck.

3. Apparatus according to claim 1, wherein the carriage passes through an aperture in the safety enclosure when moving between the first position and the second position.

4. Apparatus according to claim 1, comprising a sleeve extending through the safety enclosure, the carriage being arranged to move through the sleeve in moving between the first and second positions.

5. Apparatus according to claim 4, comprising at least one baffle arranged so that there is no line of sight through the sleeve.

6. Apparatus according to claim 1, wherein one of more of the head receiving portions of the carriage has a coarse precising arrangement arranged to position the head with a coarse precision when a head is placed in the receiving portion.

7. Apparatus according to claim 1, wherein the automated mechanism is arranged to perform one or more of i) precising the head with a fine positioning and ii) making electrical connection to the head.

8. Apparatus according to claim 1, wherein the automated mechanism comprises:

a gripper for holding said head during testing, the gripper being movable over a surface of the deck and operable to load the head to and/or unload the head from the disk; and,
a pick arranged to pick up the head from the carriage when the carriage is in the second position and to place the head in position to be gripped by the gripper.

9. Apparatus according to claim 8, wherein the pick is movable laterally with respect to the deck between a first position, where the pick can pick up a head from the carriage or set down a head on the carriage and a second position, where the pick can pick up a head from the gripper or set down a head on the gripper.

10. Apparatus according to claim 8, wherein the gripper has a fine precising mechanism that can be operated to position the head with a fine positioning whilst the head is being held by the gripper.

11. Apparatus according to claim 8, wherein the pick has two pick-up devices which are independently operable to pick up or place respective heads.

12. Apparatus according to claim 1, wherein the carriage has at least two head receiving portions.

13. Apparatus according to claim 11, wherein the carriage has at least two head receiving portions, and each pick-up device corresponds to a receiving portion of the carriage such that each pick-up device can pick up or set down a head in the respective receiving portion of the carriage substantially simultaneously.

14. A method of receiving and positioning a read/write head to a disk in a test apparatus having a safety enclosure surrounding at least the disk, the method comprising:
    a) moving a carriage to a first position wherein a head receiving portion of the carriage is outside the safety enclosure;
    b) placing a head in the head receiving portion of the carriage;
    c) moving the carriage to a second position wherein the head receiving portion is inside the safety enclosure; and,
    d) operating an automated mechanism to pick-up the head from the head receiving portion of the carriage and to load the head to a disk so that testing of the head can be carried out.

15. A method according to claim 14, comprising:
    after step c,
    e) operating said automated mechanism to place a previously-tested head in a second head receiving portion in the carriage;
    after step d,
    f) moving the carriage to the first position; and,
    g) removing the previously-tested head from carriage.

16. A method according to claim 15, wherein the automated mechanism comprises a pick having first and second pick-up devices which are independently operable to pick up or place respective heads, wherein steps d and e comprise picking up the head from the first head receiving portion of the carriage with the first pick-up device and setting down the previously-tested head in the second receiving portion of the carriage with the second pick-up device.

17. A method according to claim 16, wherein the automated mechanism comprises a gripper for holding the head during testing, the gripper being operable to load or unload the head to or from the disk, the method comprising:
    moving one or both of the gripper and the pick such that the previously-tested head is in position to be picked up from the gripper by the second pick-up device; and, moving one or both of the gripper and the pick such that the head held by the first pick-up device is in position to be gripped by the gripper.

18. A method according to claim 14, comprising repeating the steps to test a succession of heads.

19. A method of removing a tested read/write head from a test apparatus, the test apparatus comprising a deck;

a spindle on the deck and on which a disk can be mounted for rotation of the disk;

a safety enclosure surrounding at least the spindle;

a movable carriage having at least one head receiving portion for receiving said head, the carriage being movable between a first position wherein the head receiving portion is outside the safety enclosure and a second position wherein the head receiving portion is inside the safety enclosure; and, an automated mechanism arranged to pick up the head from the head receiving portion of the carriage when in the second position and to load the head to the disk for testing, the method comprising:

a) moving the carriage to a position inside the safety enclosure;

b) operating the automated mechanism to unload the tested head from the disk and to place the head in the head receiving portion of the carriage;

c) moving the carriage to a position outside the safety enclosure; and, d) removing the tested head from the carriage.

* * * * *